No. 878,123. PATENTED FEB. 4, 1908.
T. J. CRUMP.
ANIMAL TRAP.
APPLICATION FILED OCT. 21, 1907.
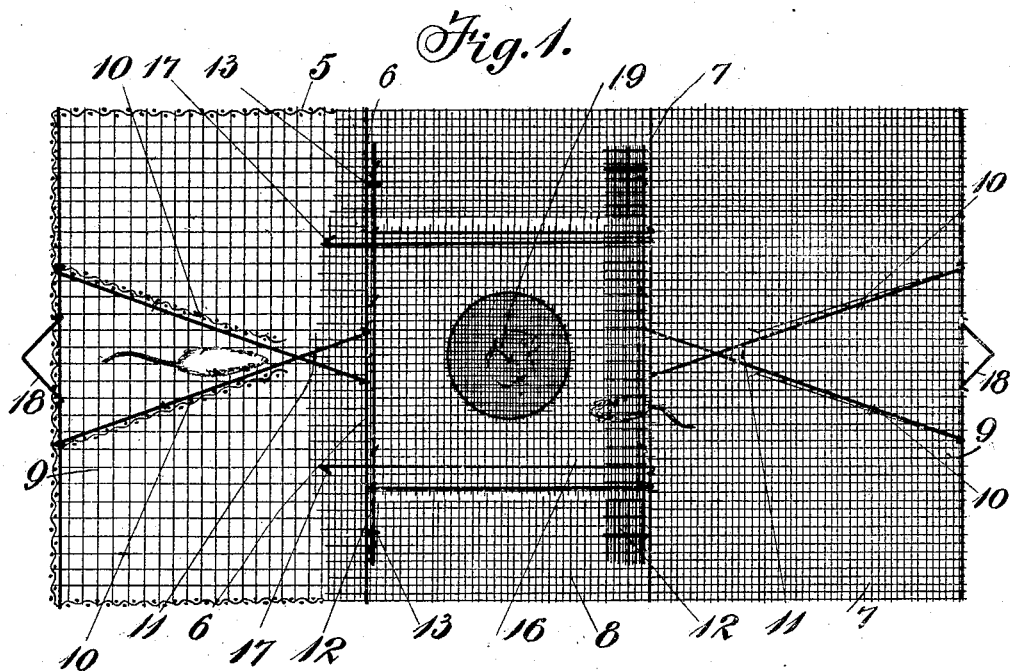
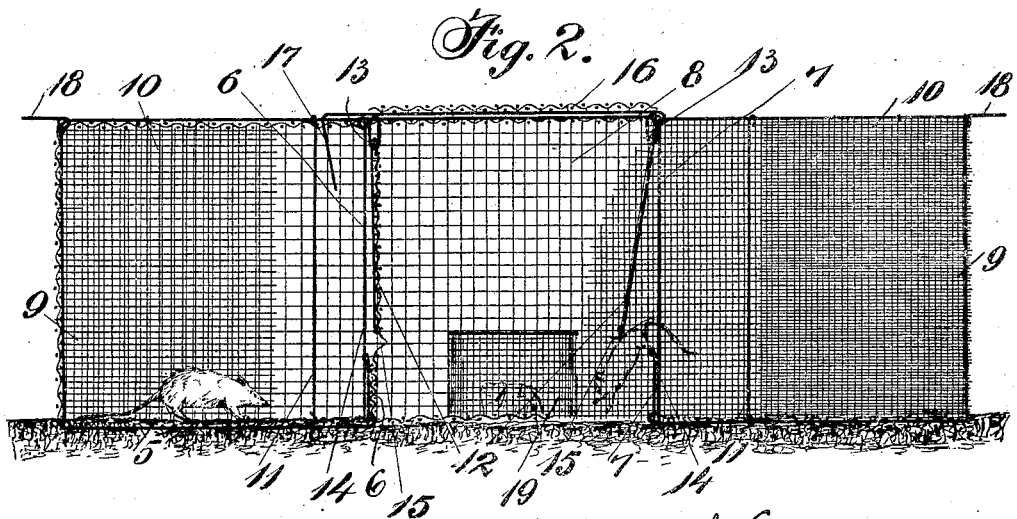

UNITED STATES PATENT OFFICE.

THOMAS JEFFERSON CRUMP, OF MERIDIAN, MISSISSIPPI, ASSIGNOR OF ONE-HALF TO SAMUEL COCKRELL, OF MERIDIAN, MISSISSIPPI.

ANIMAL-TRAP.

No. 878,123.  Specification of Letters Patent.  Patented Feb. 4, 1908.

Application filed October 21, 1907. Serial No. 398,395.

*To all whom it may concern:*

Be it known that I, THOMAS JEFFERSON CRUMP, a citizen of the United States, residing at Meridian, in the county of Lauderdale and State of Mississippi, have invented certain new and useful Improvements in Animal-Traps, of which the following is a specification.

This invention relates to animal-traps, and has for its object to provide a trap so constructed that it may be used also for catching birds and fish.

A further object of the invention is to provide a trap of the self and ever-set type which is simple in construction, strong and durable, and reliable in operation.

In the accompanying drawing, Figure 1 is a plan view of the trap partly in section. Fig. 2 is a side elevation also partly in section.

Referring specifically to the drawing, 5 denotes a cage constructed of galvanized wire-netting or other suitable material, and divided into three compartments by partitions 6 and 7, respectively. The middle compartment which is indicated by the reference numeral 8 receives the victims. At the ends of the cage are inwardly-contracted entrances to the end-compartments 9 formed by diverging walls 10 extending from the top to the bottom of the cage. In front of the inner ends of the walls 10, substantially midway therebetween, is a barrier in the shape of a post 11 extending from the top to the bottom of the cage.

In the partitions 6 and 7 are openings which are fitted with doors 12 hinged at their top edges as indicated at 13. These doors swing inwardly into the compartment 8 only, they being prevented from swinging in the opposite directions or outwardly by posts 14 located in the end compartments 9 in front of the door-openings.

The doors 12 and partitions 6 and 7 are made of galvanized wire-netting, and at the lower edges of the doors and the adjacent edges of the partitions, the netting is bent inwardly into the compartment 8 as indicated at 15 so that the sharp points of the wire will not hinder the progress of the animal through the doorway. However, if the animal attempts to withdraw when passing through the doorway he is pricked by the sharp points and thus urged forward.

Access to the compartment 8 for the purpose of placing bait therein or removing the victim, may be had through a door 16 in the top of said compartment. The door carries spring-fingers 17 engageable with the wire of the cage-top whereby the door is held securely closed. At the ends of the cage are loops 18 for suspending the cage in the water if it is to be used for catching fish.

In the compartment 8 is a cage 19 to receive bait or a decoy. For weasels, muskrats, raccoons, etc. a live chicken can be placed in the cage 19 to serve as a decoy. If the trap is baited with meat it can also be placed in the cage 19. The animal therefore cannot gain access to the decoy or bait even after he has entered the compartment 8, and the decoy and bait is thus preserved for future use. The cage 19 can also be used to hold the fish-bait if the trap is used for catching fish. In this case small artificial fish may be placed in the end compartments behind the posts 11 to serve as decoys.

The trap operates as follows: The animal enters one of the end-compartments through the contracted opening therein. The posts 11 cause the animal to turn to one side upon entering said compartment, so that an attempt to withdraw brings him against the sharp points of the wire at the inner end of the walls 10, they being also made of wire-netting. The animal is thus urged forward into the end-compartment. If he attempts to escape therefrom he would have to twist his body to get between the walls 10 which would bring him against the sharp ends of the wire again. This will urge him back into the compartment and thus frustrate the attempt to escape therefrom. The animal in his efforts to escape as well as being attracted by the bait or decoy in the compartment 8, upon finding that the door 12 gives, presses therethrough and enters said compartment from which escape is impossible as the door is prevented from swinging outwardly by the posts 14.

The trap herein described is simple in construction and therefore can be cheaply manufactured. It is strong and durable, reliable in operation, and can be used for catching rabbits, rats, mice, weasels and other small animals, as well as birds and fish. The entrance to the cage is level with the ground and may be covered at the bottom with a thin layer of earth so that the animal does not walk on the wire bottom, and is therefore not liable to be frightened upon passing through the contracted entrance to the end-compartment.

I claim:—

A trap comprising a cage having a compartment provided with a contracted entrance, a barrier adjacent to and in front of the contracted end of said entrance, a second compartment having an opening communicating with the first mentioned compartment, and a swinging door for said opening.

In testimony whereof I affix my signature, in presence of two witnesses.

THOMAS JEFFERSON CRUMP.

Witnesses:
M. ROSENBAUM,
HENRY BROOKE.